(12) United States Patent
Kadoch

(10) Patent No.: US 10,837,817 B1
(45) Date of Patent: Nov. 17, 2020

(54) FOOD INGREDIENT MEASURING DEVICE

(71) Applicant: Mayer Kadoch, Brooklyn, NY (US)

(72) Inventor: Mayer Kadoch, Brooklyn, NY (US)

( * ) Notice: Subject to any disclaimer, the term of this patent is extended or adjusted under 35 U.S.C. 154(b) by 133 days.

(21) Appl. No.: 15/987,056

(22) Filed: May 23, 2018

(51) Int. Cl.
*G01F 19/00* (2006.01)
*A47J 47/01* (2006.01)
*A47J 43/04* (2006.01)

(52) U.S. Cl.
CPC .............. *G01F 19/00* (2013.01); *A47J 43/04* (2013.01); *A47J 47/01* (2013.01)

(58) Field of Classification Search
CPC ........... G01F 19/00; A47J 43/04; A47J 47/01
See application file for complete search history.

(56) References Cited

U.S. PATENT DOCUMENTS

| | | |
|---|---|---|
| 2,302,186 A | 6/1939 | Caretto |
| 2,354,004 A | 7/1944 | Fess |
| 2,526,308 A | 10/1950 | Vorsanger |
| 2,890,816 A | 6/1959 | Horland |
| 3,498,136 A | 3/1970 | Le May |
| 2006/0049207 A1 * | 3/2006 | Bogoshian ............... A47J 47/01 222/196 |
| 2006/0191958 A1 * | 8/2006 | Brundick ............... B65D 83/06 222/158 |
| 2007/0181600 A1 | 8/2007 | Ben-Shlomo et al. |
| 2016/0116321 A1 * | 4/2016 | Lacasse .................. G01F 11/24 222/158 |
| 2018/0023991 A1 * | 1/2018 | Afshari ................... G01F 19/00 222/158 |

* cited by examiner

*Primary Examiner* — Donnell A Long
(74) *Attorney, Agent, or Firm* — Cramer Patent & Design, PLLC; Aaron R. Cramer

(57) ABSTRACT

A food ingredient measuring device includes a lower enclosure, an upper enclosure; and a release assembly that passes through the upper enclosure and into the lower enclosure. The release assembly has an activation push-button that extends from the upper enclosure, a pair of connection arms, an inner wall that is at least partially within the lower enclosure and that forms an interstitial space, a seal assembly and a holding cavity. Activation of the activation/release push-button causes the release assembly to retract the seal assembly into the interstitial space to open the holding cavity to enable capture of a cooking ingredient from a bulk container. Another activation causes the release assembly to extend the seal assembly from the interstitial space to close the cavity to capture the cooking ingredient. Another activation causes the seal mechanism to open again to dispense the cooking ingredient.

14 Claims, 6 Drawing Sheets

FOOD INGREDIENT MEASURING DEVICE

RELATED APPLICATIONS

Not applicable.

FIELD OF THE INVENTION

The presently disclosed subject matter is directed to kitchen utensils. More particularly, it is directed to food ingredient measuring devices.

BACKGROUND OF THE INVENTION

For thousands of years cooking has been one of mankind's most important activities. Cooking can be done in the home, in schools and hospitals, in military installations and aboard ships, in parks, while traveling and just about everywhere else. Cooking can be performed as a basic requirement for survival, for the pure enjoyment of turning basic foodstuffs into delectable treats, and as a profession.

Cooking at its basic is the process of preparing raw foodstuffs for consumption by heating. Usually the goal is something that is not only digestible but also pleasurable to consume. Different cultures use many different foodstuffs to prepare their native cuisines. A rather sad fact is that most basic foodstuffs are by themselves not particularly palatable. Compounding that problem is that eating the same basic foodstuff day after day can become monotonous.

However, in addition to basic foodstuffs mankind has available a very wide range of food ingredients that can enhance the flavor of basic foodstuffs. Salt, pepper, cumin, anise seeds, ajwain, bay leaf, cardamom, mustard, ground peppers of numerous types, cinnamon, ginger, garlic, poppy seeds, sesame seeds, turmeric, and curry as just a small sampling of the different cooking food ingredients available to cooks around the world.

A major problem faced daily by cooks everywhere is in measuring out different food ingredients. Another major problem is in reducing costs, which often means that the different food ingredients, which can be expensive, are bought and stored in bulk.

Various approaches have been taken in the prior art to address those and other problems with food ingredients. Spice shelves, spice racks, and bulk containers are common. Various measuring cups, spoons and other utensils are available and widely used. But cooks still clamor for better ways of measuring out desired amounts of selected food ingredients from bulk containers.

Accordingly, there exists a need for devices which enable accurate measurement of food ingredients. Beneficially such devices would be able to accurate measure out a selected food ingredient from a bulk container. Preferably such a device would be easy to use, would not take up much space, would assist in actually adding the measured amount of selected food ingredients to the food being cooked, and would be suitable for being made available at relatively low cost.

SUMMARY OF THE INVENTION

The principles of the present invention provide for devices that enable accurate measurement of food ingredients. Beneficially those devices can accurately measure out desired amounts of selected food ingredients from bulk containers. The inventive devices are easy to use, do not take up much space, assist in adding the desired amounts of selected food ingredients to the foods being cooked, and are suitable for being made available at relatively low cost.

A food ingredient measuring device that is in accord with the present invention includes a lower enclosure, an upper enclosure on the lower enclosure; and a release assembly that passes through the upper enclosure and into the lower enclosure. The release assembly has an activation/release push-button that extends from the upper enclosure, a pair of connection arms, and an inner wall that is at least partially within the lower enclosure. Activations of the activation/release push-button cause the release assembly to operate to capture and then dispense a cooking ingredient.

The food ingredient measuring device includes a side measurement indicia window for enabling a user to see how much cooking ingredient will be captured and dispensed. The quantity of cooking ingredient can be adjusted by moving the upper enclosure relative to the lower enclosure. Also included is a viewing window on the lower enclosure for enabling a user to see the captured cooking ingredient. The release assembly also includes an opening through which the cooking ingredient is dispensed.

The food ingredient measuring device further includes a flexible seal around the opening for preventing inadvertent cooking ingredient leakage. That flexible seal can be liquid tight.

The release mechanism further includes a cycle mechanism that operatively couples the activation/release push-button to the connection arms. Pressing the activation/release push-button a first time extends the connection arms. Pressing the activation/release push-button another time retracts the connection arms. That cycle repeats as the activation/release push-button is pressed.

The release mechanism also includes two semicircular seals that are attached to the connection arms and which open when the connection arms extend and which close when the connection arms retract. Also included is an interstitial space formed between the inner wall and the lower enclosure through which the connection arms travel. The two semicircular seals seal the interstitial space from intrusion of the cooking ingredient. In practice when the connection arms are extended the two semicircular seals form a waterproof seal for the holding cavity.

Also, in practice a plunger is visible within the measurement indicia window. That plunger forms a marker for the volume of a cooking ingredient that is to be captured and dispensed. A central shaft of the release assembly connects to and moves the plunger.

A measuring device that is in accord with the present invention includes a lower enclosure, an upper enclosure that extends from the lower enclosure; and a release assembly that passes through the upper enclosure and into the lower enclosure. The release assembly has an activation/release push-button that extends from the upper enclosure, a pair of connection arms, an inner wall that is at least partially within the lower enclosure; and a movable seal mechanism that is attached to the connection arms. The seal mechanism and the inner wall from an open holding cavity when the seal mechanism is moved to a first position. The seal mechanism closes the holding cavity when moved to a second position. Activation of the activation/release push-button causes the seal mechanism to move from the first position to the second position. That cycle is repeated by subsequent activations of the activation/release push-button.

In the measuring device the upper enclosure includes a measurement window for enabling a user to see how much material will be captured and dispensed. Further, the holding cavity can capture a material when the seal mechanism is in its first position. The sealing mechanism may form a liquid tight seal when in its second position.

BRIEF DESCRIPTION OF THE DRAWINGS

The advantages and features of the present invention will become better understood with reference to the following detailed description and claims when taken in conjunction with the accompanying drawings in which like elements are identified with like symbols and in which:

Figure 1:
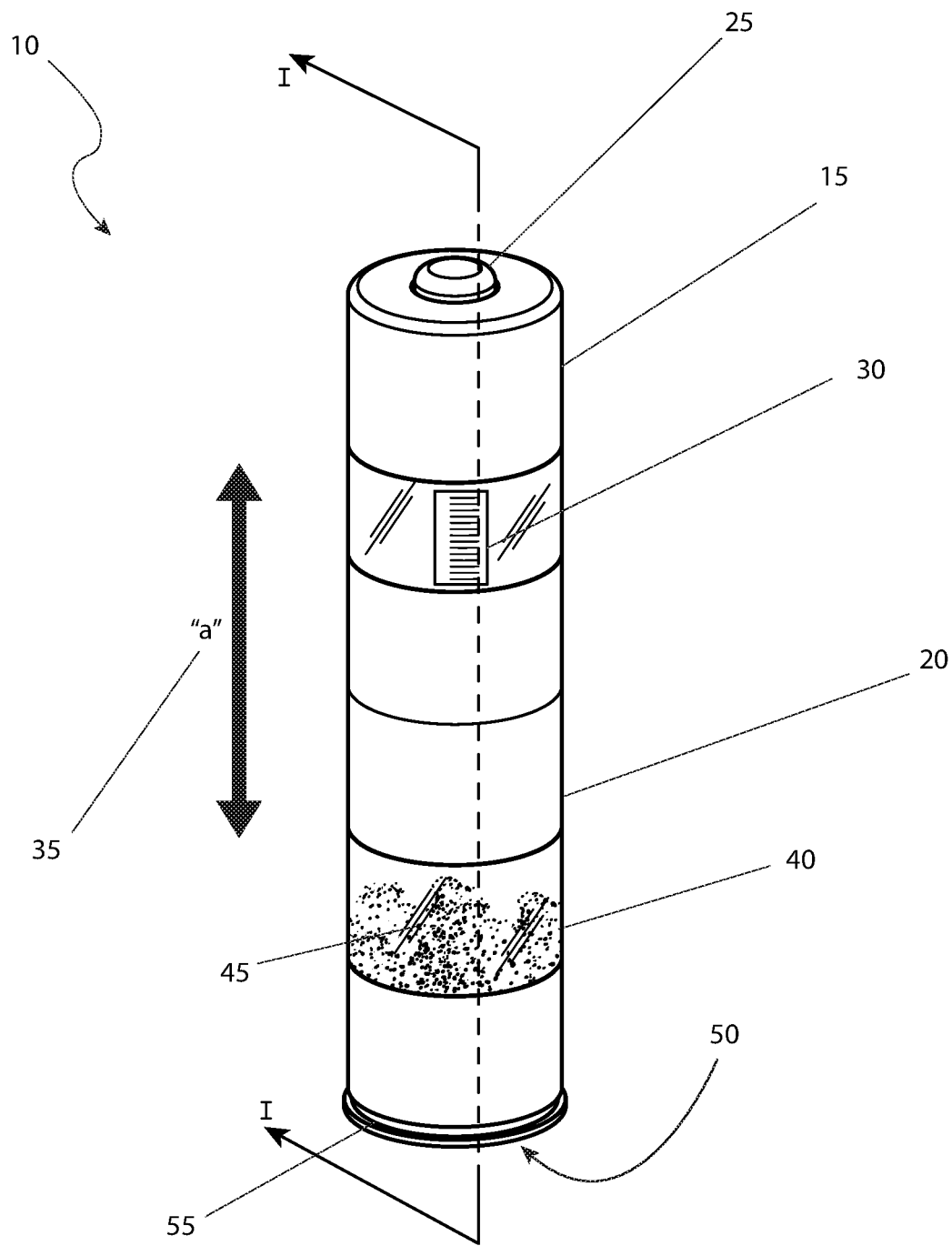
FIG. 1 is a perspective view of a food ingredient measuring device 10 that is in accord with the principles of the present invention.

DESCRIPTIVE KEY 10 food ingredient measuring device
15 upper enclosure
20 lower enclosure
25 activation/release push-button
30 measurement indicia window
35 axial travel path "a"
40 viewing window
45 cooking ingredient
50 opening
55 flexible seal
60 cycle mechanism
65 connection arm
70 movable semicircular seal
75 holding cavity
80 plunger
85 central shaft
90 interstitial space
95 inner wall
100 travel guide path
105 center point
110 first hand
115 cooking ingredient storage container
120 second hand
125 thumb

DETAILED DESCRIPTION OF THE PREFERRED EMBODIMENT

The preferred embodiment of the present invention is depicted in FIGS. 1 through 6. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one of the referenced items.

Figure 2:
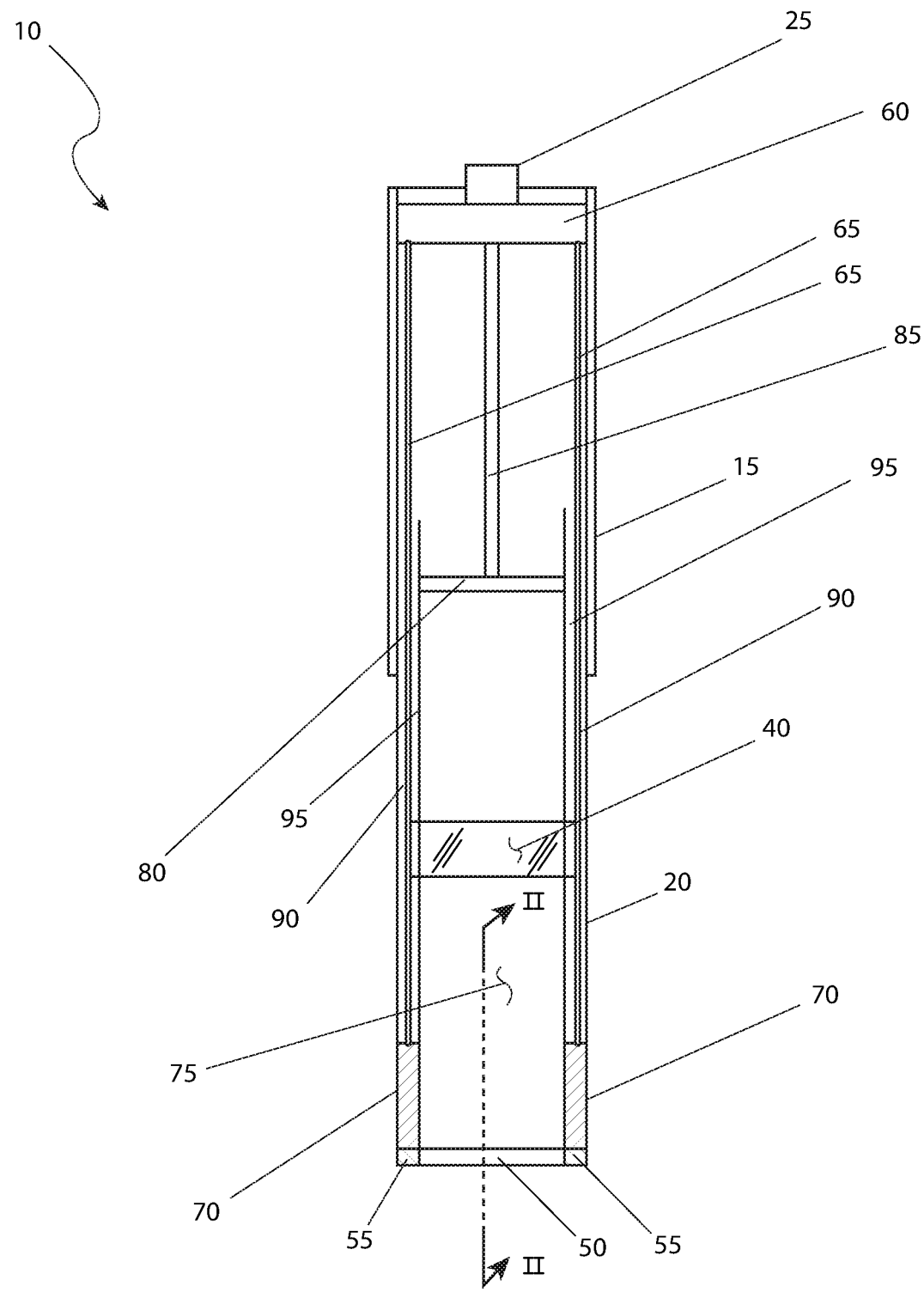
FIG. 2 is a sectional view of the food ingredient measuring device 10 shown in FIG. 1 taken along line I-I.

Refer now to FIGS. 1 and 2 for exemplary views of a food ingredient measuring device 10 that is suitable for dispensing a selected amount of a cooking ingredient 45 from a bulk container. The food ingredient measuring device 10 is divided into an upper enclosure 15, a lower enclosure 20, and an operating assembly that includes an activation/release push button and an inner wall 95. Activation of the activation/release push-button 25 causes the operating assembly to dispense a captured cooking ingredient 45 (such capture is discussed in more detail subsequently).

The upper enclosure 15 further includes a side measurement indicia window 30 that enables a user to set how much of the cooking ingredient 45 that will be dispensed by the food ingredient measuring device 10. The quantity of the cooking ingredient 45 that will be dispensed is adjusted by moving the position of the upper enclosure 15 relative to the lower enclosure 20 along an axial travel path "a" 35. Such movement changes the measurement shown on the side measurement indicia window 30.

It is envisioned that the maximum quantity of a dispensed cooking ingredient 45 might vary per the overall size of the food ingredient measuring device 10. A smaller version, say approximately five to seven inches (5-7 in.) long and approximately one inch (1 in.) in diameter, would be used for small amounts of ingredients ranging from one-half teaspoon to three tablespoons (½ t-3 T). A larger version might be able to dispense one-quarter cup up to two cups (¼-2 c). However, it should be understood that neither the size, the ingredient dispensing capability, nor the units of measure is intended to be a limiting factor of the present invention.

The lower enclosure 20 includes a viewing window 40 that enables a user to see the cooking ingredient 45 that will be dispensed. The lower enclosure 20 also includes a bottom opening 50 through which that cooking ingredient 45 is captured (see below) and falls when being dispensed. In addition, a flexible seal 55, envisioned to be rubber, neoprene, or similar material, is provided around that opening 50 to prevent internal cooking ingredient 45 leakage.

The food ingredient measuring device 10 is designed to hold both solid (powder and/or granular) material as well as liquid. To that end the flexible seal 55 can form a liquid tight seal to prevent liquid cooking ingredient 45 leakage into the food ingredient measuring device 10. It is envisioned that the upper enclosure 15, the lower enclosure 20, and the inner wall 95, along with other major components of the food ingredient measuring device 10 would be made of a food grade durable plastic.

Figure 5:
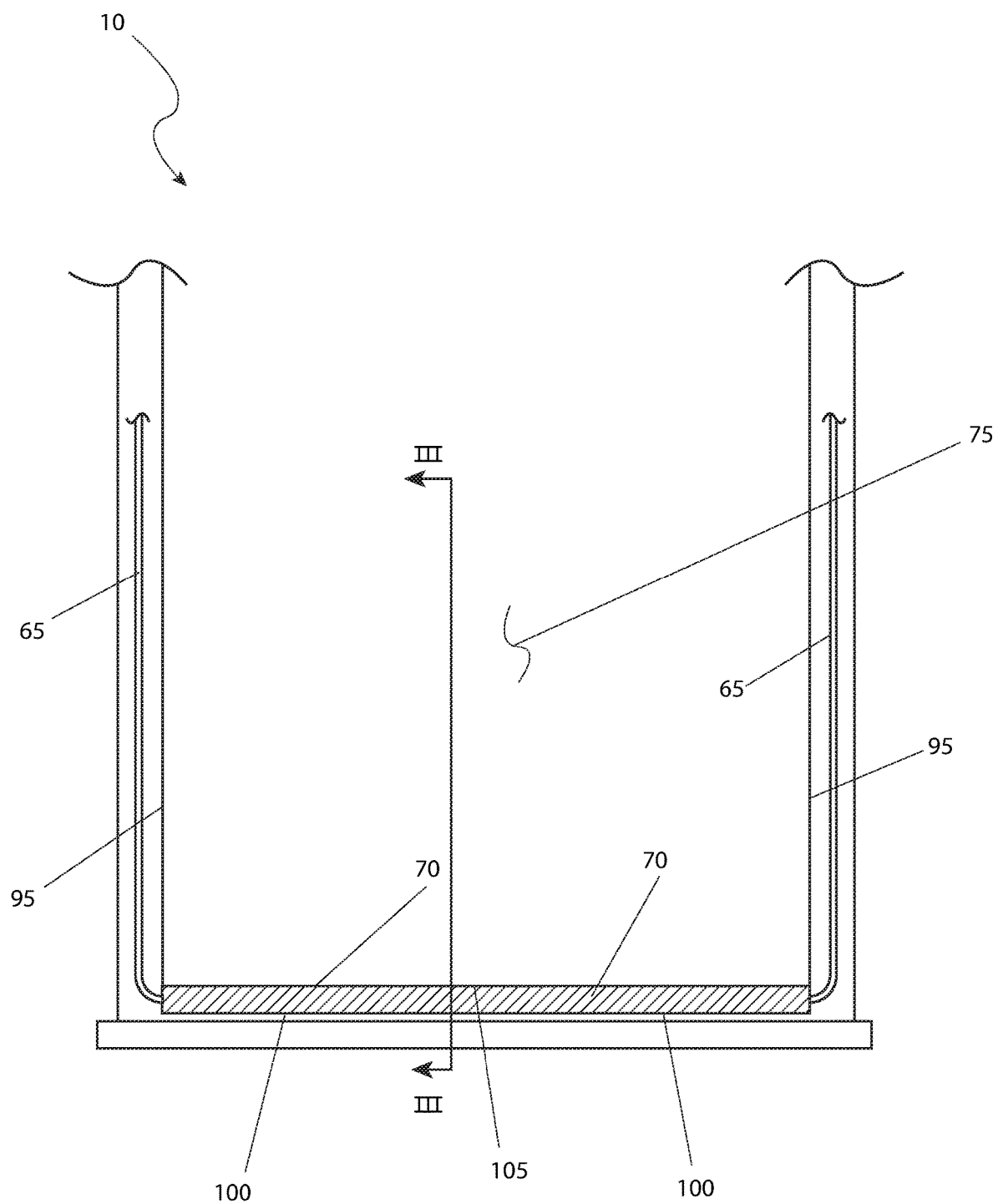
FIG. 5 is a detailed sectional view of the food ingredient measuring device 10 taken along line II-II of FIG. 2; and, FIG. 6 is a perspective view of the food ingredient measuring device 10 in use.

Referring now primarily to FIGS. 2 and 5, the activation/release push-button 25 connects to a cycle mechanism 60 which induces up and down motion in two (2) connection arms 65. When the activation/release push-button 25 is pressed once the connection arms 65 extend. As the activation/release push-button 25 is pressed a second time the connection arms 65 retract. That cycle is repeated with subsequent pressings of the activation/release push-button 25. The lower ends of the connection arms 65 connect to two (2) movable semicircular seals 70. The operation and function of the semicircular seals 70 are described in greater detail below.

Figure 3:
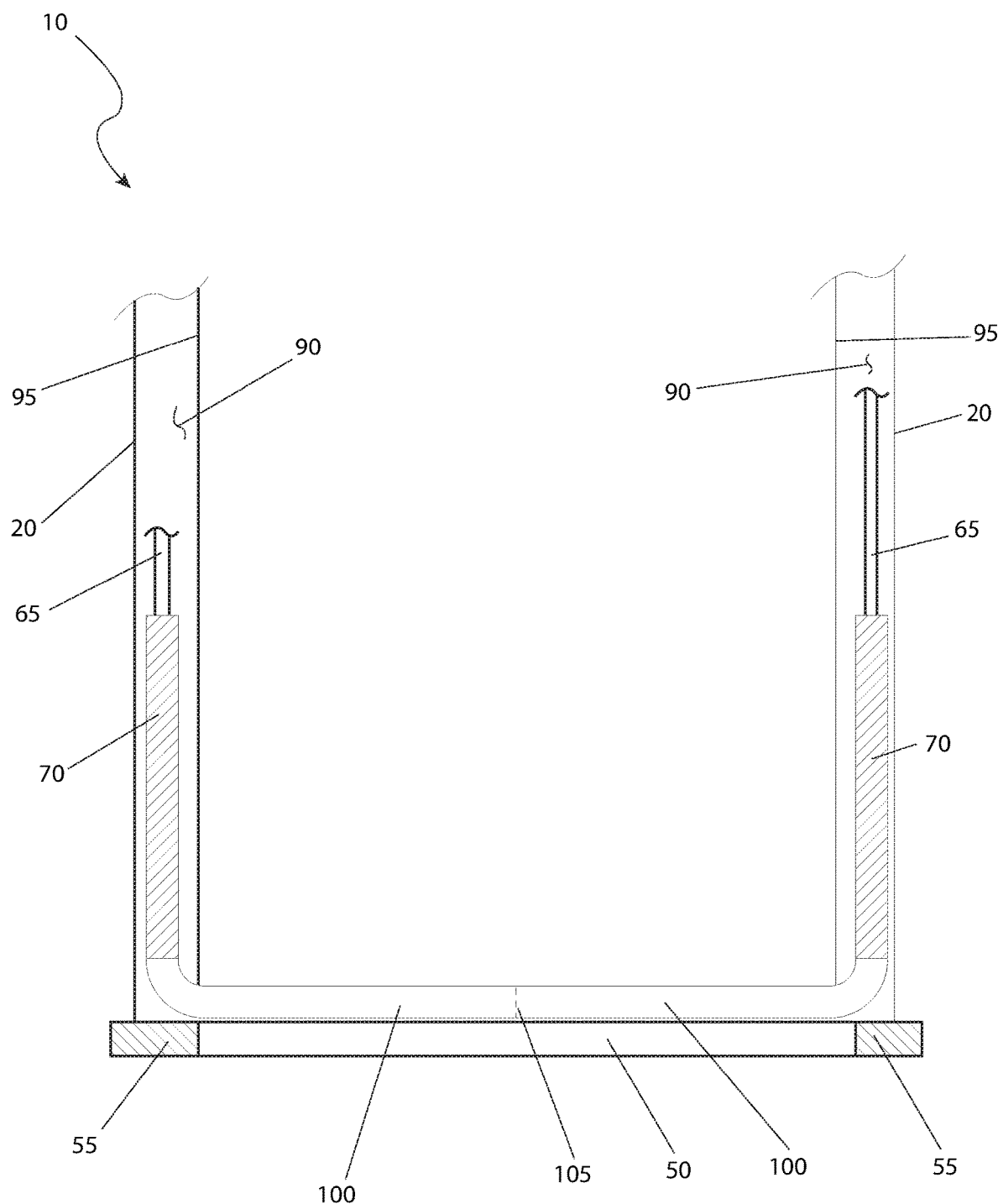
FIG. 3 is a detailed sectional view of the food ingredient measuring device 10 taken along line II-II of FIG. 2.
Figure 4:
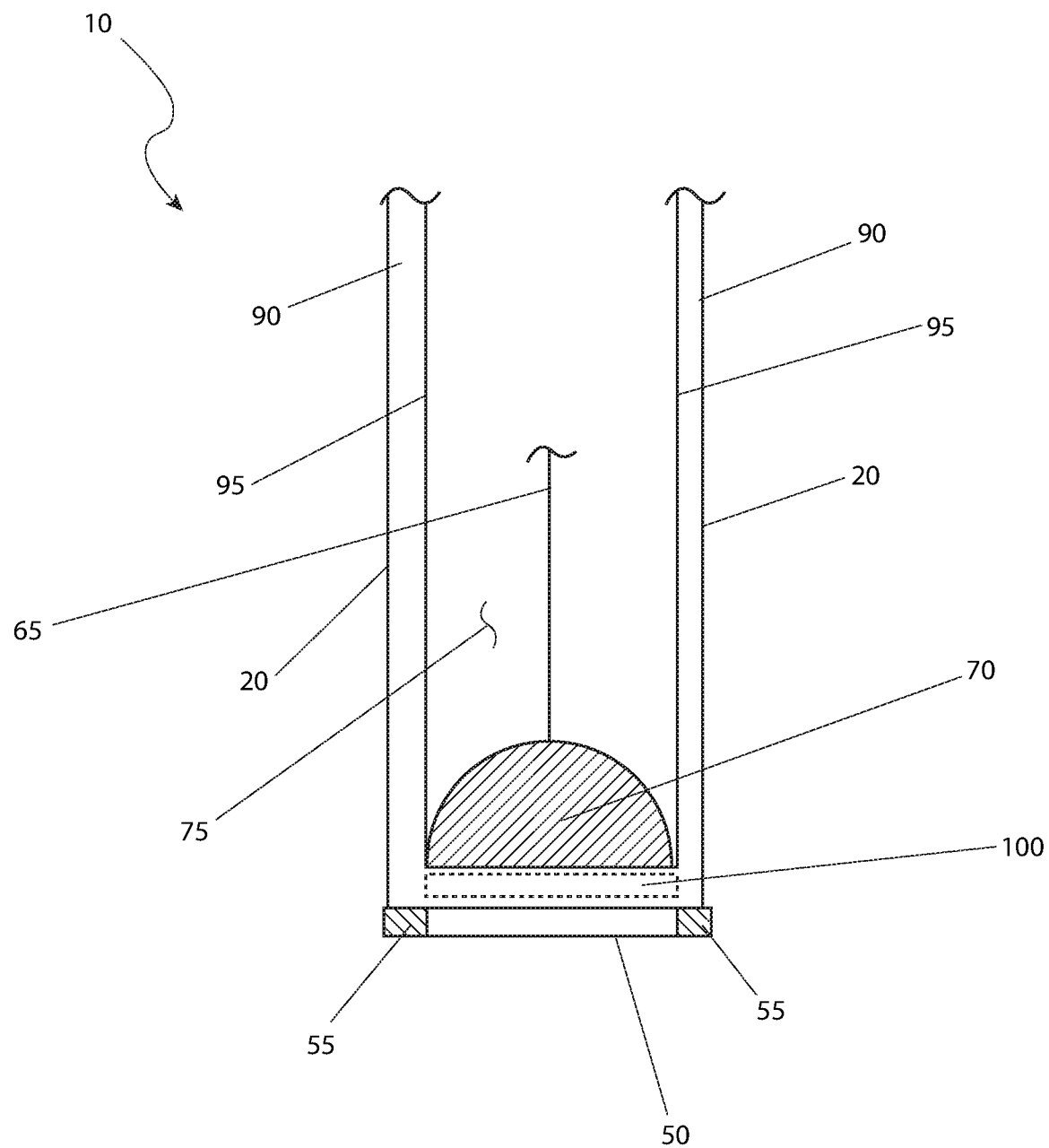
FIG. 4 is a detailed sectional view of the food ingredient measuring device 10 taken along line III-III of FIG. 5.

Referring now to FIGS. 1-5 as required, the semicircular seals 70 assists the flexible seal 55 (see FIGS. 3 and 4) in forming a waterproof seal to prevent leakage of in any cooking ingredient 45 (see FIGS. 1 and 3) that may be held in a holding cavity 75 (see FIGS. 3-5). The contents of the holding cavity 75 can be seen through the viewing window 40 (see FIG. 1). The holding cavity 75 volume is controlled by a plunger 80 (see FIG. 2) which moves in the lower enclosure 20 along axial travel path "a" 35 of FIG. 1. It is envisioned that the plunger 80 would be made of rubber, neoprene, or a similar product so as to form a waterproof seal for the holding cavity 75.

The position of the plunger 80, visible within the measurement indicia window 30 (as shown in FIG. 1), forms a marker for the volume of the cooking ingredients 45 to be captured and then dispensed. The plunger 80 is fixed to the lower surface of the cycle mechanism 60 by a central shaft 85. As shown, an interstitial space 90 is formed between an inner wall 95 and the lower enclosure 20. The connection arms 65 travel in that interstitial space 90.

Referring now to FIGS. 3 and 5, when opened the two (2) movable semicircular seals 70 are retracted along a travel guide path 100 (located above the flexible seal 55) into the interstitial space 90 by retraction of the connection arms 65. When the connection arms 65 are extended the bottoms of the movable semicircular seals 70 move along the travel guide path 100 to meet at a center point 105 to form a water proof seal for the cavity 75. Further details are provided below.

Refer next to FIG. 4 for a sectional view taken along line III-III of FIG. 5. FIG. 4 is turned ninety degrees (90°) relative to FIG. 5 and specifically shows the semi-circular nature of the movable semicircular seals 70 (only one (1) is shown due to graphical limitations). FIG. 4 also shows the top of the movable semicircular seal 70 being attached to the connection arms 65. As those structures are flexible they can move along the travel guide path 100. It should be noted that the semicircular seals 70 are normally open and provide complete access to the holding cavity 75. The lowermost corners of the movable semicircular seals 70 are curved along the circular nature of the interstitial space 90 formed by the inner wall 95 and the lower enclosure 20. As such, the lowermost corners of the semicircular seals 70 match with one another. This feature forms a seal against the inner wall 95 all along its perimeter, thus prohibiting the cooking ingredients 45, whether liquid or solid, from entering the interstitial space 90.

FIG. 5 presents a detailed sectional view along line II-II of FIG. 2 when the food ingredient measuring device 10 a closed. The connection arms 65 move the two semicircular seals 70 seal together at a center point 105 as guided into position by the travel guide path 100. This provides a water tight seal between the two (2) movable semicircular seals 70 and the cavity 75 while the flexible seal 55 help seal the interstitial space 90. Additionally, the upper side of the two (2) movable semicircular seals 70 form a waterproof seal against the lower edge of the inner wall 95, thus holding any cooking ingredients 45 (not shown) inside the holding cavity 75.

The preferred embodiment of the present invention can be utilized by a user in a simple and effortless manner with little or no training. It is envisioned that the food ingredient measuring device 10 would be constructed in general accordance with FIG. 1 through FIG. 6. The user would procure a food ingredient measuring device 10 with particular attention paid to overall capacity of the food ingredient measuring device 10.

After procurement, but prior to use, the food ingredient measuring device 10 would be cleaned, washed, rinsed, and air dried to remove any contaminants and remaining manufacturing by products.

Figure 6:
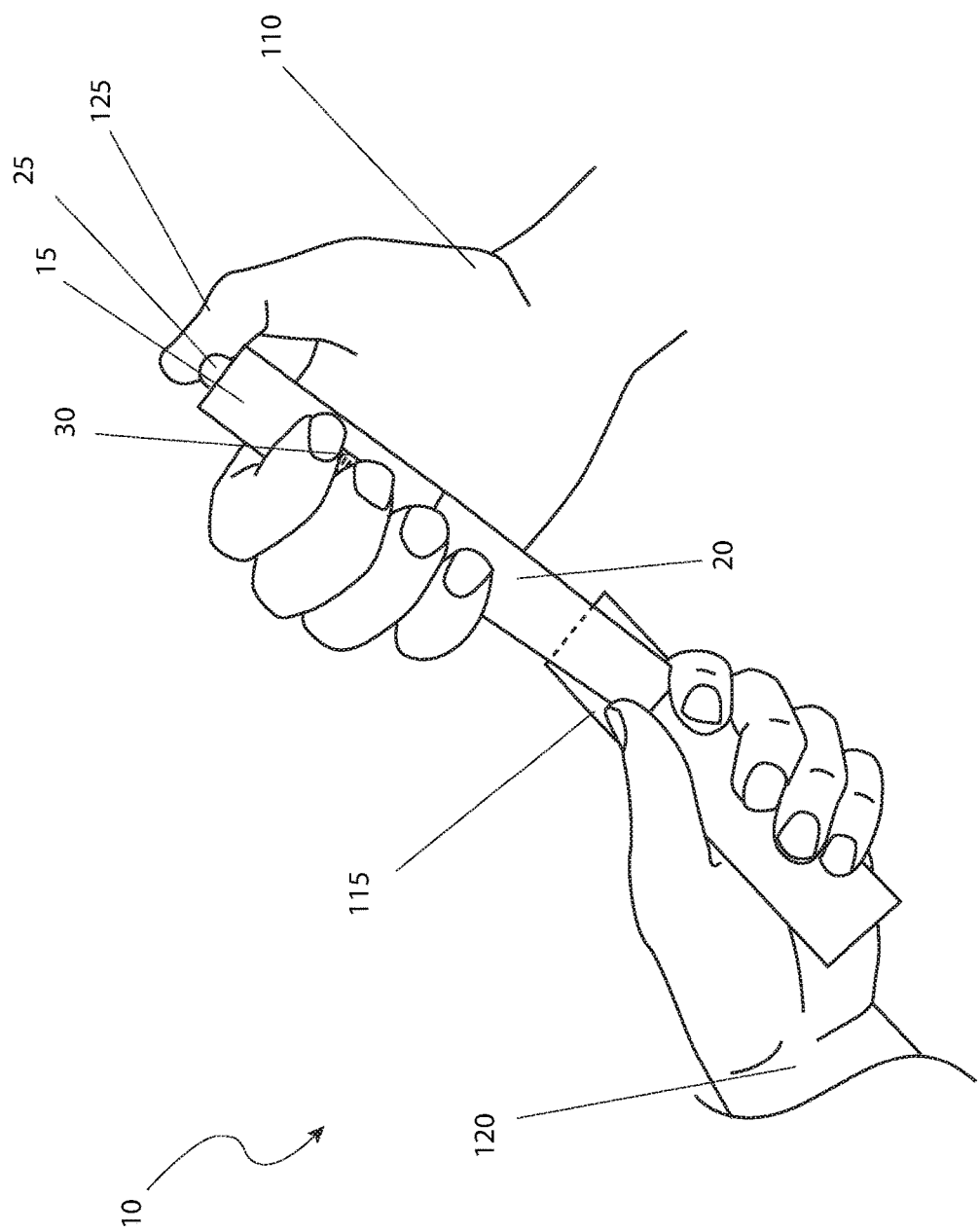

FIG. 6 presents a perspective view of the food ingredient measuring device 10 being used. A user selects the desired amount of cooking ingredients 45 (not shown) to be dispensed by adjusting the plunger 80 using the measurement indicia window 30. Next, while holding the food ingredient measuring device 10 in one hand 110 and a cooking ingredient storage container 115 in the other hand 120, the food ingredient measuring device 10 is filled from the cooking ingredient storage container 115 via the opening 50 by pressing the activation/release push-button 25 to open the holding cavity 75 and then inserting the food ingredient measuring device 10 into the storage container 115.

The food ingredient measuring device 10 is then removed from the cooking ingredient storage container 115 and positioned over a cooking pan, baking pan, mixing bowl, or similar receptacle; finally, the activation/release push-button 25 is pressed again, thus returning the movable semicircular seals 70 to their retracted or open position, and allowing the cooking ingredients 45 to exit the opening 50 via gravity.

After use of the food ingredient measuring device 10 it is envisioned that it would be cleaned, washed, rinsed, and allowed to dry before using again. It is anticipated that the food ingredient measuring device 10 could be washed or rinsed by hand or washed in a dishwasher.

The foregoing descriptions of a specific embodiment of the present invention have been presented for purposes of illustration and description. They are not intended to be exhaustive or to limit the invention to the precise forms disclosed. Obviously, many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated.

The invention claimed is:

1. A food ingredient measuring device, comprising:
a lower enclosure;
an upper enclosure on said lower enclosure;
a release assembly passing through said upper enclosure and into said lower enclosure, said release assembly having an activation/release push-button that extends from said upper enclosure, a pair of connection arms operatively connected to said activation/release push-button, and an inner wall at least partially within said lower enclosure; and,
an opening through which said cooking ingredient is captured and dispensed;
wherein activation of said activation/release push-button causes said release assembly to operate to dispense a captured cooking ingredient; and,
wherein said release assembly includes a cycle mechanism coupling said activation/release push-button to said connection arms.

2. The food ingredient measuring device according to claim 1, wherein said upper enclosure includes a side measurement indicia window for enabling a user to see how much cooking ingredient will be captured.

3. The food ingredient measuring device according to claim 2, wherein a quantity of said cooking ingredient that will be captured is adjusted by moving said upper enclosure relative to said lower enclosure.

4. The food ingredient measuring device according to claim 3, further including a viewing window on said lower enclosure for enabling a user to see a captured cooking ingredient.

5. The food ingredient measuring device according to claim 4, further including a plunger visible within said measurement indicia window that forms a marker for a volume of a cooking ingredient to be captured.

6. The food ingredient measuring device according to claim 5, further including a central shaft of said release assembly that connects to said plunger.

7. The food ingredient measuring device according to claim 1, further including a flexible seal around said opening for preventing inadvertent cooking ingredient leakage.

8. The food ingredient measuring device according to claim 1, further including a liquid tight flexible seal around said opening for preventing a captured cooking ingredient from contacting said connection arms.

9. The food ingredient measuring device according to claim 1, wherein pressing said activation/release push-button a first time extends said connection arms and pressing said activation/release push-button a second time retracts said connection arms.

10. The food ingredient measuring device according to claim 9, wherein pressing said activation/release push-button a first time captures a cooking ingredient and pressing said activation/release push-button a second time dispenses said cooking ingredient.

11. The food ingredient measuring device according to claim 10, further including two semicircular seals connected to said connection arms which open when said connection arms extend and which close when said connection arms retract.

12. The food ingredient measuring device according to claim 11, further including an interstitial space between said inner wall and said lower enclosure through which said connection arms travel.

13. The food ingredient measuring device according to claim 12, wherein said two semicircular seals seal said interstitial space from intrusion of a cooking ingredient.

14. The food ingredient measuring device according to claim 12 wherein when said connection arms are extended said two semicircular seals form a waterproof seal holding any cooking ingredient inside a holding cavity.

* * * * *